United States Patent [19]

Howard et al.

[11] E Patent Number: Re. 32,725

[45] Reissued Date of Patent: Aug. 2, 1988

[54] WATER-SOLUBLE VEGETABLE PROTEIN AGGREGATES

[75] Inventors: Paulette A. Howard; Michael Campbell; David T. Zollinger, all of Decatur, Ill.

[73] Assignee: Central Soya Company, Inc., Fort Wayne, Ind.

[21] Appl. No.: 732,088

[22] Filed: May 9, 1985

Related U.S. Patent Documents

Reissue of:

[64] Patent No.: 4,234,620
Issued: Nov. 18, 1980
Appl. No.: 973,195
Filed: Dec. 26, 1978

[51] Int. Cl.[4] ..... A23J 3/00

[52] U.S. Cl. ..... 426/656; 530/378

[58] Field of Search ..... 426/656, 640; 260/123.5

[56] References Cited

U.S. PATENT DOCUMENTS

| | | | |
|---|---|---|---|
| 2,835,586 | 5/1958 | Peebles . | |
| 2,953,458 | 9/1960 | Leeuwarden . | |
| 3,008,830 | 11/1961 | Winder et al. . | |
| 3,402,165 | 9/1968 | Bock . | |
| 3,505,079 | 4/1970 | Meade et al. . | |
| 3,520,066 | 7/1970 | Meade . | |
| 3,615,723 | 10/1971 | Meade . | |
| 3,620,763 | 11/1971 | Hans . | |
| 3,642,490 | 2/1972 | Hawley et al. . | |
| 3,669,677 | 6/1972 | Sair et al. . | |
| 3,723,407 | 3/1973 | Miller et al. | 260/123.5 |
| 3,728,327 | 4/1973 | Frazeur et al. | 260/123.5 |
| 3,734,901 | 5/1973 | Hayes et al. . | |
| 3,741,273 | 6/1973 | Meade . | |
| 3,744,763 | 7/1973 | Schnöring et al. . | |
| 3,849,391 | 11/1974 | Egger et al. | 260/123.5 |
| 3,853,839 | 12/1974 | Magnino et al. | 260/123.5 |
| 3,865,956 | 2/1975 | Fukushima et al. . | |
| 4,018,755 | 4/1977 | Wang | 260/123.5 |
| 4,054,679 | 10/1977 | Meller et al. | 426/656 |
| 4,113,716 | 9/1978 | Gomi et al. | 426/634 X |

FOREIGN PATENT DOCUMENTS

| | | |
|---|---|---|
| 1218803 | 5/1960 | France . |
| 1302991 | 1/1973 | United Kingdom . |

OTHER PUBLICATIONS

Washburn, R. M., "The Physical Analysis of Dry Milk", J. Dairy Sc., 5; 1922, pp. 388–389.

Federal Register, Section 102.75, Part III, Jul. 14, 1978.

Andrews, P., "The Gel-Filtration Behavior of Proteins Related to Their Molecular Weights over a Wide Range", Biochem. J. (1965) 96, pp. 595–606.

Dubois, M. et al., "Colorimetric Method for Determination of Sugars and Related Substances", Analytical Chemistry, vol. 28, No. 3, Mar. 1956, pp. 350–356.

Bradford, M., "A Rapid and Sensitive Method for Quantitation of Microgram Quantities of Protein Utilizing the Principle of Protein-Dye Binding", Anal. Biochem., 72(1976), pp. 248–254.

McCutheon's Detergents and Emulsifiers, North American Ed., 1977.

*Primary Examiner*—Robert Yoncoskie

*Attorney, Agent, or Firm*—Tilton, Fallon, Lungmus & Chestnut

[57] ABSTRACT

Aqueous protein dispersions obtained from vegetable sources are subjected to successive pressure and cavitation cycling (e.g., centrifugal homogenization) at temperatures below the protein heat denaturization and under slightly alkaline pH's (e.g., pH 7.0–8.0) to provide a high NSI product. These high NSI products may be dried to provide a vegetable seed product having functional properties and utility similar to milk proteins. Buffered salt extracts from such spray-dried products reveal a predominant restructuring of the protein constituents into high molecular weight protein aggregates. Low NSI soy concentrates obtained by aqueous alcohol extraction processes are converted into a high NSI product possessing many of the desirable functional attributes of soy isolates plus those of milk proteins.

4 Claims, No Drawings

WATER-SOLUBLE VEGETABLE PROTEIN AGGREGATES

Matter enclosed in heavy brackets [ ] appears in the original patent but forms no part of this reissue specification; matter printed in italics indicates the additions made by reissue.

BACKGROUND OF THE INVENTION

Proteinaceous products obtained from seed materials have been extensively used as partial replacement or extender for proteins derived from animal, marine and poultry sources. Defatted proteinaceous materials are conventionally manufactured by extracting lipids and oils from full-fat seed meals or flakes. Protein concentrates are manufactured by extracting the water-soluble or aqueous-alcohol soluble constituents from defatted seed materials. Protein isolates are obtained by isolating the vegetable protein from the non-protein constituents.

Defatted vegetable proteinaceous materials are commonly referred to by the art as vegetable protein products (e.g. Section 102.75, Proposed Rules, Federal Register, July 14, 1978, Part III) with the word "vegetable" being often replaced to identify the seed protein source (e.g. soy protein products). Vegetable protein products containing less than 65% protein are referred to as flour, those containing 65% or more protein by weight to less than 90% seed protein by weight are classified as protein concentrates, and isolates as containing 90% by weight protein or higher.

Indigenous seed constituents adversely affect flavor, odor, flatulent and digestive characteristics of the vegetable protein products. Protein denaturization manufacturing conditions (e.g. heat, alcohol extraction) are customarily used to eliminate these indigenous constituents. Protein denaturization substantially reduces solubility of the vegetable protein.

Vegetable protein products are susceptible to substantial chemical and physical alteration by what may appear to be only minor processing changes. An infinite number of different vegetable protein products may be prepared by simply altering the preparatory processing conditions. The vegetable protein readily reacts or complexes with itself or other constituents indigenous to the seed material as well as processing additives or process conditions which are conventionally used during the vegetable protein product manufacture. The implementation of certain processing changes to correct a specific functional defect often adversely affects one or more equally important functional attributes of the vegetable protein product.

The colloidal or water-soluble vegetable protein concentration (i.e. by weight water-soluble protein) is an important factor in many food recipes (e.g. comminuted meats, diary products, bakery, etc.). Analytically, the water-soluble protein concentration can be ascertained by the nitrogen solubility index (NSI) or protein-in-solution (PIS) tests as shown in Example I. Although the prior art abounds with divergent processing conditions which may be used to correct flavor, odor, digestibility, etc. deficiencies, little progress has been made towards improving the NSI of vegetable protein products. The proposed NSI improvements have been either expensive or impractical in the manufacture of a low-cost vegetable protein product. The problem of achieving a high NSI value becomes particularly acute when an unhydrolyzed, unfractionated protein concentrate or isolate is the desired end-product.

Crushing and homogenization techniques have been used to manufacture vegetable protein products. These techniques are most frequently used in protein isolate production. In the isolate manufcture, the protein is typically extracted with either alkali or acid and then precipitated from solution by isoelectric pH adjustment. The extraction process may cause limited protein hydrolysis and protein fractionation occurs as a result of the isoelectric precipitation thereof.

In U.S. Pat. No. 3,402,165 a high purity vegetable protein product is prepared by finely mashing soybean meal at a pH 3–7 (preferably at its isolectric point) and screening the mash to separate a non-fibrous fraction from a fiber. The fibrous portion, which contains a small amount of occluded protein, is passed through a device at a relatively low temperature to break down the fiberous material by means of supersonic oscillations without destroying the fiber structure per se. After washing with water, the purified fibers are recovered and the proteins removed from the purified fiber is combined with the main protein fraction obtained as a result of the screening step.

High-viscosity vegetable protein concentrates are reportedly prepared in U.S. Pat. No. 3,723,407 by Miller et al. by subjecting a defatted soy flour slurry at the protein isoelectric point (@ pH 3.5–5.5, 4°–38° C. and 10% d.s.) to centrifugation and differential pressures while passing the slurry through a shearing orifice under momentary pressure build-up and sudden pressure release (reportedly disrupts the natural cell structure of the protein), separating the solubles from insolubles (fiber and protein), resuspending the insolubles (@ pH 6.5–8.0 and 40°–80° C.) and spray-drying the resultant protein concentrate.

A patent by Egger et al. (U.S. Pat. No. 3,849,391) discloses a continuous process for producing a vegetable protein product (reportedly low in trypsin inhibitors and undenatured protein) by jet-cooking a defatted soy flour slurry at a pH other than its isoelectric point. In U.S. Pat. No. 4,018,755 vegetable seed protein are extracted from defatted soy flour by sonicating a low solids, alkali flour slurry; centrifuging the sonicate and recovering a water-soluble protein therefrom. U.S. Pat. No. 3,728,327 reportedly produces protein isolates by homogenizing a low solids soy flour slurry, centrifuging the homogenized slurry and recovering the protein isolate from the supernatant by reverse osmosis.

OBJECTS

It is an object of the present invention to increase the NSI value of a vegetable protein product having a low NSI.

Another object of the invention is to increase the level of water-soluble protein in a vegetable protein product without causing substantial protein hydrolysis or fractionation.

A still further object is to provide an economical and efficient process for improving the efficacy of the vegetable protein products in aqueous systems.

It is an object of this invention to provide a vegetable protein which simulates the functionality of milk proteins.

DESCRIPTION OF THE INVENTION

According to the present invention there is provided a process for increasing the water-solubility of a vegetable protein product, said process comprising the steps of:

(A) supplying an aqueous seed feed stream to a homogenizer with said feed stream containing on a dry solids basis at least 30% by weight vegetable seed protein and a sufficient amount of base to maintain the feed stream within said homogenizer at a pH between about 6.5 to 9.0;

(B) increasing the water-solubility of the vegetable seed protein by subjecting the aqueous feed stream in the homogenizer to successive pressure and cavitation cycling at a temperature between about 50° C. to about 150° C.; and (C) recovering the vegetable protein product having an improved water-solubility therefrom.

The protein products produced in accordance with this invention have unique and atypical protein properties. Unlike conventional isolates of a high NSI which predominantly contain water-soluble proteins with a molecular weight less than $5\times10^5$, the water-soluble protein constituents herein are predominantly comprised of high molecular weight region protein aggregates. The reason why the protein product herein exhibits improved water-solubility characteristics even though the molecular weight is significantly greater than the prior art water-soluble vegetable protein products is not fully understood.

Products prepared in accordance with the present invention exhibit many desirable properties. Included amongst these desirable improvements are enhanced water-solubility, colloidal, compatibility with lipophiles and hydrophiles, flavor, odor, mouthfeel, binding, fat emulsifying and stabilizing properties. Protein raw materials of a 25 NSI or less (e.g. NSI from about 5 to about 10) are easily converted into a vegetable protein product having an NSI of 50 or higher. These improvements are achieved without increasing the concentration of water-soluble, low molecular weight proteins. Unprocessed raw materials with poor aqueous solubility and a high proportion of low molecular weight (M.W.) protein are converted into water-soluble products predominantly comprised of protein aggregates having a molecular weight greater than $5\times10^6$. Contrary to expectations, such high molecular weight protein aggregates are water-soluble and improve upon the overall protein solubility of the processed product.

Gel chromatography of buffered salt extracts of spray-dried products subjected to the processing conditions of this invention indicates a rearrangement and restructuring of the vegetable protein constituents. It appears as though the process realigns the hydrophilic groups within the protein aggregate into a more stable and water-soluble form. Consequently, the processed vegetable protein products may be concentrated and dried to provide a dried product which will dissolve in aqueous dispersants. Compatibility with lipophiles (in aqueous systems) is apparently achieved by a concomitant more orderly restructuring of the lipophilic group to provide, in conjunction with the hydrophilic rearrangement, a product having an improved HLB. Studies upon buffered salt extracts obtained from spray-dried products reveal a predominant (meaning greater than any others) protein distribution of protein aggregates within the greater than $1.5\times10^6$M.W. region relative to those protein constituents respectively found within either the less than $5\times10^4$M.W., $5\times10^4-3.7\times10^5$M.W., $3.7\times10^5-1\times10^6$ M.W. or the $1\times10^6-1.5\times10^6$M.W. regions. Typically the amount of protein aggregate having a $1.5\times10^6$ M.W. in the buffered salt extract will exceed the next most prevelant protein region (as defined above) by at least 10% and most typically by at least 15% by weight.

The restructuring of both the high molecular weight water-soluble proteins into water-soluble protein and the lower molecular weight protein fractions into larger molecular weight protein aggregates significantly reduces the lower molecular weight concentration with a proportionate increase in the high molecular weight protein aggregate concentration. Protein concentrates, which cannot be effectively placed into aqueous solution (e.g. NSI 8–10) and containing as the most predominant water-soluble constituent, a protein within either the less than $5\times10^4$ M.W., $5\times10^4-3.7\times10^5$ M.W. or $3.7\times10^5-1\times10^6$ M.W. region, are converted by the process into a water-soluble, high NSI processed product wherein the predominant constituent is greater than a $1.5\times10^6$ M.W. These results are atypical of conventional water-soluble proteins which typically exhibit a predominance of protein constituents within either the $3.7\times10^5-1\times10^6$ M.W. region (a maximum peak at about $7\times10^5$ M.W.) or $<5\times10^4$ M.W. (peaking at approximately $2.15\times10^4$ M.W.). Unlike conventional soy protein products which typically [contains] *contain* about 40% or more of the water-soluble protein constituents within these two predominant regions, the products herein typically contain less than 35% by weight and most typically not more than 25% by weight of its total water-dispersible protein concentration within the $3.7\times10^5-1\times10^6$ M.W. and $<5\times10^4$ M.W. regions.

On a proportionate weight basis, alteration in protein distribution within the five aforementioned regions occurs. Buffered salt extracts of spray-dried and processed products herein typically contain protein aggregates of a M.W. greater than $1.5\times10^6$ in an amount at least three times greater than those within the $1\times10^6-1.5\times10^6$ region and at least two times greater than the proteins found within either the $3.7\times10^5-1\times10^6$ or $<5\times10^4$ region. In contrast, the prior art products typically contain a significantly greater proportion of protein within these two latter regions. Advantageously the products prepared in accordance with the present invention contain at least four times (preferably at least about 5 times) more of the $>1.5\times10^6$ M.W. proteins than those within the $1\times10^6-1.5\times10^6$ region and at least three times (preferably at least 4 times) more of these high molecular weight proteins than those proteins found within either the $3.7\times10^5-1\times10^6$ M.W. or $<5\times10^4$ regions. Attempts to characterize the high molecular weight species present in the processed product indicate essentially all the proteins excluded by $>1.5\times10^6$ gel chromatography are also excluded from a $5\times10^6$ M.W. gel.

Illustrative vegetable proteinaceous materials which may be used to prepare the high NSI products herein include low NSI and low fat seed proteins such as defatted proteinaceous materials obtained from grains and oil-bearing seed materials such as peanuts, cottonseed, soybeans, sesame, rape seed, safflower seed, sunflower seed, corn, wheat, mixtures thereof and the like. Proteinaceous materials from the leguminous oil-bearing seeds are advantageously employed as a protein source with soy protein being most preferred. Representative soy proteins include defatted soybean meals or flours, soy protein concentrates (e.g. see U.S. Pat. No. 3,734,901 by L. P. Hayes et al.), and soy protein isolates, mixtures thereof and the like. The invention is particularly applicable to low NSI soy protein concentrates. Soy protein concentrates having NSI values which favorably compare with those historically achieved only by chemical or enzymatic hydrolysis and isolation processes, such as soybean isolates, may be prepared. Soybean proteins manufactured under heat or alcoholic denaturing conditions (e.g. toasting, extraction of lipids and/or water-soluble constituents with alcohol containing solvents or aqueous alcohol) may be likewise converted into high NSI products.

The dry solids level of the aqueous feed stream is diluted with a sufficient amount of water to permit its conversion from a low to high NSI and PIS product. In general, the water to protein weight ratio in the starting material will range from more than 6:1 to about 30:1 and advantageously from 7:1 to about 18:1 with about a 9:1 to about 15:1 weight ratio being preferred. An excessively high solids level becomes too viscous which can create transfer, uniform homogenization processing pH control and product recovery problems. A low solids level is undesirable because of economics and difficulties in achieving the appropriate degree of shear and restructuring of the protein product.

The processing pH materially affects the efficacy of the resultant product. During the centrifugal homogenization step, the pH is maintained within the pH 6.5 to 9.0 range. If the pH is permitted to increase above the pH 8.5 level with prolonged exposure at processing temperatures in excess of 150° C. alkaline protein hydrolysis and undesirable lysinoalanine formation can occur. Under normal processing conditions and upon completion of the centrifugal homogenization, the feed stream alkalinity will decrease by approximately 0.3–0.5 pH units. Thus, the feed slurry alkali adjustment should take into account the pH decrease which occurs during the processing of the product. Practical experience indicates the slurry pH is most suitably adjusted by adding, upon the basis of the protein weight, a predetermined amount of alkali to the slurry which will yield an appropriate alkalinity in the processed product. Conventional pH meters and reading devices are generally unreliable because of pH drifting.

When reconstituted with water, commercial protein products typically are slightly acidic (e.g. pH 6.0–6.8). Effective conversion into a high PIS and NSI product requires an alkaline pH adjustment. Advantageously, the pH adjustment should be sufficient to provide a discharge product pH ranging from about 7.0 to about 8.5. The discharge from the centrifugal homogenizer will typically have about 0.3–0.5 pH unit decrease from that which would normally be expected (i.e. upon amount of base in the unprocessed aqueous feed slurry). This unaccountable change in pH is apparently due to restructuring and exposure of previously occluded carboxyl groups within the processed product. Further improvements in water-solubility of the protein product are achievable by adding a sufficient amount of base to the aqueous feed stream to provide a homogenized product having a pH of 7.3 or higher. Advantageously the amount of alkali added to the slurry is sufficient to provide a product discharging from the centrifugal homogenizer of a pH ranging from about 7.5 to about 8.0 with optimum product performance being achieved at a product discharge pH of about 7.6 to 7.8.

Although a variety of organic and inorganic bases may be used to adjust the slurry pH, high NSI products of a food grade are advantageously prepared by adjusting the alkalinity of the aqueous feed stream with a metal hydroxide such as the alkaline earth metal hydroxide (e.g. CaOH, etc.) and/or alkali metal hydroxides (e.g. potassium, sodium, etc. hydroxides). The divalent cations of alkaline earth hydroxides are more susceptible to complex with other complexing indigenous constituents of the protein seed material (e.g. proteins, phytins, carbohydrates, etc.). The alkali metal hydroxides are preferred.

When sodium hydroxide is utilized to adjust the aqueous slurry to an alkaline pH, a discharge pH 7.0 and pH 8.5 will normally be obtained by employing from about 0.26 to about 1.1 parts by weight sodium hydroxide (d.s.b.) for each 100 parts by weight protein (d.s.b.). To operate at a discharge pH within the pH 7.5–7.8 range, the amount of sodium hydroxide added to the slurry (100 pbw protein, d.s.b.) will typically range from about 0.8 to about 1.0 parts by weight. A corresponding equivalency of potassium hydroxide (about 1.4 times more) is used when it is the adjusting base.

Restructuring of the protein constituents and its conversion into a high NSI product is achieved by subjecting the slightly alkaline aqueous feed stream to successive shear, pressure and cavitation cycling in a centrifugal homogenizer at a temperature between about 50° C.–150° C. The successive and cavitation cycling in the centrifugal homogenizer is typically achieved by a rotor (e.g. a conical impeller, rotating rings, etc.) which accelerates the aqueous stream past a stator or stationary rings. The rotor and stationary rings are typically comprised of a series of projections or depressions such as teeth, holes, pins and the like, operatively arranged at a relatively close tolerance (e.g. 0.25 to 1.3 mm). The successive pressure and cavitation cycling causes rupturing, molecular rearrangement and aggregation of the aqueous suspended dry solids constituents therein. Steam is normally injected into the feed port to heat the aqueous feed to the proper processing temperature and to assist in the cavitation cycling by steam condensation. In a typical centrifugal homogenizer, the product is centrally admitted to the centrifugal homogenization chamber, accelerated radially by the conical rotor under high shear and deflection with cyclic cavitation and pressure occurring as the feed stream is radially accelerated between the projected and recessed members of the rotor and stationary rings. Illustrative centrifugal homogenizers include those which are equipped with a single feed stream inlet as well as those equipped with at least two supply pipes arranged concentrically such as disclosed in U.S. Pat. No. 3,744,763 by H. Schnöning et al.

Temperature and discharge pH are significant processing variables which contribute towards the PIS of the processed product. The processing temperature and pH (65° C.–115° C. and pH 6.8–8.5) interrelationship to product PIS may be expressed by the following equation:

$$PIS = 5.7459C - 0.1717C^2 - 0.22932C\ pH + 606.5\ pH - 37.8169\ pH^2 - 2574.6$$

wherein "PIS" represents the calculated protein in solution (in percent) for the processed product. "C" represents the centrifugal homogenization processing temperature (°C.) and "pH" represents the pH of the product as discharged from the centrifugal homogenizer. The optimum pH effect upon the PIS is between a pH 7.6–7.7 with the more acidic or alkaline conditions at any given temperature resulting in a lower PIS product.

In general, the product PIS at any given pH will increase as the operative temperature increases. Operation at the optimum pH level (e.g. about pH 7.7) permits a lower processing temperature to achieve a high product PIS value with higher temperatures being required to achieve an equivalent PIS level when the process is conducted at a non-optimum pH. The production of a high PIS or high NSI product without thermally or hydrolytically degrading the protein product significantly enhances the overall functionality of the processed product.

The processing conditions necessary to achieve a particular PIS product from the above equation may be empirically calculated. For example, the following coordinate process variables (i.e. pH and °C.) may be used to achieve the following PIS values: pH 6.8 at 109° C. or pH 7.31 at 80° C. or pH 7.8 at 74° C. for a 54 PIS product; pH 6.97 at 115° C. or pH 7.66 at 84° C. or pH 7.8 at 83° C. for a 66 PIS product; a pH 7.0 at 115° C. or pH 7.66 at 90° C. or pH 7.8 at 90° C. for a 72 PIS product; and pH 7.6 at 115° C. or pH 7.66 at 115° C. or a pH 7.7 at 115° C. for a 84 PIS product. As illustrated by the aforementioned equation and calculated coordinate values, operation at the optimum pH (about 7.7) at any given temperature will produce a higher PIS product than those processes operated outside the optimum pH range. Correspondingly a higher "C" contributes towards a higher PIS product.

Pragmatically the minimum temperature for effective production of a PIS product having a minimum PIS of 55% will be in excess of 75° C., greater than 82° C. for a minimum 65% PIS, greater than 88° C. for a minimum 70% PIS, greater than 92° C. for a minimum 75% PIS and greater than 93° C. for a minimum 80% PIS product. Although protein concentrates having a PIS up to about 85 may be prepared, it is difficult to consistently manufacture protein concentrates having a PIS in excess of 82. Temperatures in excess of 135° C. are prone to cause LAL and off-flavor products and therefore are desirably avoided.

If the starting vegetable seed material contains more than 10% non-protein constituents (e.g. soy flours, concentrates, etc.), the processing temperature is advantageously maintained at a level sufficient to permit the volatilization of undesirable residues (e.g. malodorous, bitter or beany flavors, flatulant, etc. principles) therefrom. This may be accomplished by maintaining the processing temperature at a level sufficient to permit such undesirable residues to volatilize therefrom (e.g. 85° C. to about 120° C. under superatmospheric conditions coupled with flash cooling to steam distill or flash-off the volatile residues therefrom). The preferred processing temperature is between about 90° C. to about 110° C.

Other processing variables affecting the NSI and PIS, but to a lesser extent, include rotor RPM, flow rate, head type, rotator and stator clearance, solids level. The head type and clearance will affect the textural character of the processed product. Coarse grinding heads tend to produce gritty products which may be suitably used for applications in which a non-gritty texture is not an essential prerequisite. For products necessitating a non-gritty texture (e.g. dairy, bakery products, etc.) fine grinding heads may be used. Satisfactory products have been prepared at rotor speeds of about 3500 to 6000 RPM, clearance of about 0.9 mm to 1.15 mm and flow rates of 2 gallon/min. to 5 gallon/min.

The molecular weight of indigenous carbohydrate constituents affects the viscosity characteristics of the processed product. Buffered-salt-extractable carbohydrate constituents of a molecular weight greater than $1.5\times10^6$ create more viscous products than those having less than a $5\times10^5$ molecular weight. The process does not appreciably increase the amount of low molecular weight carbohydrate in processed protein concentrates. The process, however, significantly increases the level of water-soluble carbohydrates extractable with the $1.5\times10^6$ M.W. plus protein fraction. If a low viscosity product is desired, proteinaceous feed materials which contain buffered-salt-extractable, indigenous carbohydrate constituents of a molecular weight less than $5\times10^4$ as a major carbohydrate and less than 20% by weight carbohydrate of a M.W. greater than $1.5\times10^6$ are utilized as a raw material source. Low viscosity products are advantageously obtained with feed materials which contain at least 75% carbohydrates of a M.W. less than $5\times10^4$ with less than about 10% by weight of the salt-extractable carbohydrates having a M.W. greater than $1.5\times10^6$. Protein concentrates prepared by the hexane-alcohol, (fat) and aqueous alcohol extraction processes (e.g. see U.S. Pat. No. 3,734,901 by Hayes et al.) are a particularly suitable starting material for this purpose.

The processed product may be used in its liquid form or dried to provide a product of a high NSI or PIS. The processed product pH is appropriately adjusted to suit its intended end-use. Except for certain limited applications, most food applications are acidic. Vegetable protein products at an alkaline pH characteristically possess a soapy taste. In general, the processed protein will be adjusted with an acid to a pH from about 5.0 to about 7.0. In the preferred embodiments of this invention, the processed vegetable seed protein product is adjusted to an acidic pH between about 6.0 to about 7.0 with a pH between about 6.5 to 6.9 being most preferred.

The present process restructures and stabilizes the protein constituents into a form which permits it to be dried into a high NSI vegetable seed protein product. Although the processed product is less susceptible to heat denaturization than conventional products, drying conditions which may lead to heat denaturization of the proteins are desirably avoided. High drying temperatures, semi-dry product (e.g. 100° C.) for prolonged times (e.g. 5 minutes) can impair the product NSI. A variety of conventional drying techniques may be used (e.g. drum-drying, forced air, freeze-drying, vacuum, fluidized beds, etc.). The processed product is typically dried to a moisture content of less than 10% by weight and preferably within the range of about 4% to about 8% by weight percent moisture.

Spray-drying is particularly effective in providing a high NSI product. Spray-drying outlet temperatures in excess of 130° C. tend to yield lower NSI products than those products prepared at an outlet temperature of less than 125° C. Advantageously the spray-drying outlet temperature is maintained between about 70° C. to about 115° C. with an outlet temperature of about 80° C. to about 100° C. being preferred.

The wettability and reconstitutability of the high NSI spray-dried products herein in water are similar to those of spray-dried milk powders (e.g. NFDM). Similar to milk powders, the surfaces of the individual particles are readily wettable to form a paste which protects the interior portion of the particle from further dissolution into the aqueous solution. Upon mixing the pasted surface of the individual particles will bond together with other particles to form an agglutinated mass thereof. This problem can be corrected by employing conventional techniques heretofore used by the milk industry to instantize the wettability and reconstitutability of dried non-fat milk solids in aqueous systems.

Analgous to NFDM, spray-driers appropriately equipped with spray-drying nozzles and operated under conditions to yield particles of a uniform size, shape and form which will readily reconsitute in aqueous medium (e.g. see Washburn, R. M., 1922 J. Dairy Science 5, 388–389) may be used to instantize the product. Conventional classification techniques (e.g. air, screening, etc.) will provide appropriately sized particles therefore. Agglomeration techniques (e.g. see U.S. Pat. No. 2,835,586 by D. Peebles) are also an effective means to provide a product which readily reconstitutes into aqueous systems. Another method is by the forminous mat methodology such as disclosed in U.S. Pat. Nos. 3,520,066; 3,615,723 and 3,741,273 by R. E. Meade. Aeration techniques which create thin-walled or aerated products such as by spray-drying (e.g. see U.S. Pat. No. 3,505,079 by Meade et al.) or vacuum dried foams may also be utilized to instantize the product. Rapid cooling of the particles (e.g. see U.S. Pat. No. 3,008,830 by Winder et al.) have been suggested as a means to improve upon the cold-water-dispersibility of the product.

Surface active agents (e.g. see McCutcheon's, Detergents and Emulsifiers, North American Edition, 1977 and column 9, lines 6—column 10, line 15 of U.S. Pat. No. 3,620,763 by R. Hans) may be added to the surface of the dried particles (e.g. see U.S. Pat. No. 2,953,458 by Sjollema, French Pat. No. 1,218,803) or agglomerated therewith or incorporated into the processed product prior to its drying (e.g. see technique and emulsifiers disclosed by Meade in U.S. Pat. No. 3,505,079) to improve upon its cold-water-dispersibility. Lecithin, edible non-ionic surface active agents (e.g. see columns 9–10, U.S. Pat. No. 3,620,763 by Hans) such as the fatty acid esters of mono- and diglyceride (e.g. polyoxyethylene mono- and diglyceride of $C_{12}$–$C_{22}$ fatty acids, etc.), the partial fatty acid esters of hexitol anhydrides (e.g. sorbitan fatty esters), the polyoxyalkylene derivatives of partial esters of fatty acids and hexitol anhydrides, mixtures thereof and the like are particularly useful for this purpose.

An important attribute of products processed in accordance with the present invention is the ability to provide a low-viscosity, reconstituted product at high solid levels. This attribute in conjunction with the ability to form high-molecular-weight protein aggregates or colloids in aqueous systems typifies the unique functionality of lacteal proteins (e.g. non-fat milk solids, caseins, etc.). Accordingly, the high NSI vegetable seed protein products of this invention may be utilized as a supplement (e.g. extender) or replacement for conventional lacteal proteins in a wide variety of food, pharmaceutical and industrial applications. Illustrative culinary uses include bakery applications (e.g. breads, pastries, rolls, cakes, doughnuts, cookies, crackers, fabricated or expanded snacks, etc.), cereal and convenience foods (e.g. breakfast cereals, instant breakfasts, canned foods, etc.), infant foods, confectionaries (e.g. candy, puddings, malted milks, milkshakes, custards, ice cream, toppings, icings, frostings, etc.), processed meats (e.g. poultry rolls, braunschweiger, sausages, frankfurters, weiners, semi-moist pet foods, fish cakes, meatballs, patties, meat loaves, bologna, etc.), filled milks and other applications wherein caseinates are conventionally used.

The high NSI products herein are particularly useful in formulated food products which contain at least 5% triglyceride (e.g. edible fats and oils). The high NSI products are more compatible with aqueously dispersed triglycerides and therefore permit higher fat levels to be incorporated into the food product. The water-solubility, exceptional emulsifying and stabilizing effect coupled with its binding properties enhances it functionality in comminuted meat formulations. A stable fat emulsion[1] containing 2% more by weight salt, about 5% to about 30% high NSI vegetable seed protein, about 30% to about 70% water and up to about 60% triglyceride may be prepared from the present high NSI and PIS protein. Particular stable triglyceride systems are achieved in aqueous formulations containing from about 45 to about 55 parts by weight water and about 25 to about 40 parts by weight triglyceride for each 15 parts by weight high NSI protein product. The ability to form stable fat emulsions renders these products particularly suitable for dry mix formulations which contain 5% (by weight) or more triglyceride (e.g. cake mixes, toppings, etc.).

1 – Defined as within the limits being defined by the equation: $Y = -807.86 + 0.1132\ W^2 + 0.3285\ P^2 + 15.57990 - 0.06458\ O^2$ wherein Y represent a value of less than 8.5, P, W, and O respectively represent the high NSI soy protein concentrate, water and oil weight percents.

The following examples are illustrative of the invention:

EXAMPLE 1

A low NSI protein concentrate was processed into a 70 NSI product. The centrifugal homogenizer employed in this example was a Supraton Model 200 Series, manufactured and distributed by Supraton F.J. Zucker KG, Dusseldorf, Federal Republic of Germany, equipped as a Model 247.05 with a fine grinding head, and inlet pipe fitted with a steam injection unit for temperature control and a discharge pipe (4 ft.) having a terminal control ball valve for back-pressure regulation with internally positioned pressure and temperature gauges. The inlet pipe to the centrifugal homogenizer was connected to a mixing vessel for slurry make-up and pH adjustment. The discharge pipe was connected to a neutralizing mixing vessel for pH adjustment and then spray-dried.

In this example, an aqueous feed slurry was prepared by uniformly admixing together in the mixing vessel 1000 parts by weight PROCON[2], 7000 parts by weight water and 6 parts by weight sodium hydroxide (d.s.b.). The aqueous feed slurry was pumped to the centrifugal homogenizer at a flow rate of 5 gallons/min. with the steam injection unit being adjusted to 20–40 psig steam pressure. The centrifugal homogenizer was operated at 6,150 RPM and 0.9 mm clearance. The back-pressure in the discharge pipe was maintained at about 30 psig and *the temperature to 104° C. The discharge product (pH 7.8) was neutralized to a pH 6.4 at 71° C. with 10 N HCl. The neutralized product was then conducted through a high pressure piston pump operated at 2500 psig to a concurrent-flow spray drier having a capacity (water) of approximately 1,000 pounds per hour, equipped with a No. 51 nozzle and a No. 425 flat top core by Spraying Systems, Inc., Wheaton, IL. In the dryer, the inlet air temperature was maintained from 210° C. to 225° C. and the outlet temperature from 92° C. to 98° C.*

2 - PROCON 2000 - manufactured and distributed by the Protein Division of the A. E. Staley Manufacturing Company, Decatur, Illinois having 6.0% moisture, 71.5% protein (moisture-free basis), 0.3% fat (ether extraction), 3.5% crude fiber, 5.3% ash, 17.7% carbohydrates (by difference), a 6.8 pH and NSI of 8, water absorption of 3.0–3.5 to 1 and oil absorption of 1 to1. [the temperature to 104° C. The discharge product (pH 7.8) was neutralized to a pH 6.4 at 71° C. with 10 N HCl. The neutralized product was then conducted through a high pressure piston pump operated at 2500 psig to a concurrent-flow spray drier having a capacity (water) of approximately 1,000 pounds per hour, equipped with a No. 51 nozzle and a No. 425 flat top core by Spraying Systems, Inc., Wheaton, IL. In the dryer, the inlet air temperature was maintained from 210° C. to 225° C. and the outlet temperature from 92° C. to 98° C.] and the tests herein encompass dissolved and colloidally dispersed proteins.

The NSI of the spray-dried product was determined by AOCS BA1165 - Official Method. The PIS of the product discharged from the centrifugal homogenizer was determined by taking a 200 gram sample, centrifuging the sample at 5000×g relative centrifugal force for 20 minutes, filtering the supernatant through Eaton-Dikeman Grade 513, 18.5 cm fluted filter paper and analyzing the filtrate for percent d.s. and percent protein (Kjeldahl method). The percent protein in solution was then determined by the following equation:

$$P/S = \frac{\text{gms soluble protein in solution}}{\text{total grams protein in sample}} \times 100$$

Gel filtration was conducted upon the spray-dried high NSI product. Gel filtration chromatography was performed on a 1.3 cm I.D.×87 cm column containing Bio Gel A-1.5 m, 100 200 mesh resin (Bio Rad Laboratories, Richmond, Ca., Lot 176982). The elution buffer contained 0.4 M NaCl, 0.1 M TRIS-Cl (Tris[Hydroxymethyl]Aminomethane) and 0.02% $NaN_3$, pH 7.60. A flow rate of 10 ml/hr. was maintained with a parastaltic pump (Pharmacea Fine Chemicals, Uppsala, Sweden, Model P-3, 2 mm I.D. tubing). The elution was monitored at 254 nM (LKB Instruments, Inc., Rockville, Maryland, Type 4701A) and 1 ml. fractions were collected (LKB Model 7000 Ultrorac ®).

Individual fractions were assayed for their absorbance at 280 nM (Beckman Instruments, Inc., Fullerton, Ca., ACTA II ® spectrophotometer). Proteins were determined as described by M. M. Bradford (1976) in Anal. Biochem., 72, 248–254, "A Rapid and Sensitive Method for the Quantitation of Microgram Quantities of Protein Utilizing the Principle of Protein-Dye Binding" using bovine gamma globulin (Bio Rad Laboratores, Lot 17447) as a standard. Total neutral carbohydrates, were determined by the method of M. DuBois et al., (1956) Anal. Chem. 28, 350–356, "Colorimetric Method for Determination of Sugars and Related Substances" using glucose (Sigma Chem. Co., St. Louis, Mo.) as a standard.

The column was calibrated with proteins of known molecular weight thereby allowing the molecular weight of sample proteins to be evaluated (see P. Andrews (1965) Biochem., J., 96, 595–606 "The Gel-Filtration Behavior of Proteins Related to Their Molecular Weight over a Wide Range"). Standard proteins included Apoferritin (Calbiochem, San Diego, Ca., horse spleen, Lot 601535), Aldolase (Pharmacea Fine Chem., Lot DN-11), Conalbumin (Sigma Chem. Co., chicken egg white, Lot 46C-81215), Ovalbumin (Sigma Chem. Co., Lot 18C-8035-1), Chymotrypsinogen (Calbiochem., bovine pancrease, Lot 701586) and Cytochrome C (Sigma Chem. Co., horse heart, Lot 48C-7370). The void volume was determined with Dextran 2000 (Pharmacea Fine Chem.).

Gel filtration was also performed using a 1.3 cm I.D.×78 cm column of Bio Gel A-5 m, 100/200 mesh resin at a flow rate of 10 ml/hr. The buffer and support equipment was identical to that described for Bio Gel A-1.5 m chromatography.

The spray-dried, high NSI samples were treated in the following manner prior to gel filtration chromatography. A 10 g. sample was extracted for one hour at room temperature with 90 g. of buffer containing 0.4 M NaCl, 0.1 M TRISD-Cl (Tris[Hydroxymethyl-]Aminomethane), 0.02% $NaN_3$, pH 7.60. The mixture was stirred (manual spatula stirring for one minute in 150 ml. beaker followed by magnetic stirring at medium speed with Fischer Catalogue No. 14-511-1V2 stirrer) for 9 minutes after which time, the pH was adjusted, if necessary to pH 7.60 with saturated NaOH (@ 23° C.). Magnetic stirring was then continued for an additional 50 minutes. The mixture was centrifuged at 12,000×g for 30 min. at 10° C. and an aliquot of the supernatant was subjected to gel filtration chromatography.

For comparative purposes, molecular weight zones were chosen by use of the protein molecular weight standard curve. These zones are as follows: $>1.5\times10^6$, $1.5\times10^6-1\times10^6$, $1\times10^6-3.7\times10^5$, $3.7\times10^5-5\times10^4$, and $<5\times10^4$. The protein distribution of the sample extract is presented as the percent of the total protein which elutes within a specific molecular weight region.

The resultant spray-dried soy protein concentrate product (100% particles through a 100 mesh screen) had a 70.1 NSI, a pH 6.7 upon reconstitution with water @5% solids) and contained 67.3% protein (d.s.b.), 4% fiber, 0.372% sodium, 6.5% moisture and 6.0–6.6% ash. The protein and carbohydrate M.W. distribution is similar to those reported in Run 1 of Example II. Brookfield viscosities (20 rpm at 23° C.) at 5%, 10% and 15% (by weight) concentrate levels in water were respectively 20 cps, 700 cps and 7750 cps. In order to ascertain the ability of the spray-dried product to form stable fat emulsions, a series of fat emulsions were prepared. These fat emulsions were prepared by weighing out the protein, salt, oil and water; manually mixing in a 250 ml. beaker until smooth; heating in boiling bath with continuous manual mixing to 175° F.; cooling the emulsion to 125° F., and centrifuging 25 gm. aliquots in 50 ml. centrifuge tubes for 10 minutes at 281×g relative centrifugal force (1600 rpm-5¼"). No fat separation was observed for those test samples having a "Y" value of less than 8.5 per the footnote 1 equation given above. The spray-dried product was employed as a substitute binder for milk protein in a variety of comminuted meat products (e.g., frankfuters, liver sausage, weiners, luncheon meats) containing from about 1 to about 15% spray-dried product. The characteristics of the resultant comminuted meat products were equivalent in quality and workability to the milk protein control formulations. Conventional layer cakes-dry mixes were prepared by replacing NFDM and a portion of the egg albumin in the formulation with the spray-dried product. The quality of the soy protein recipes were comparable to the control recipes.

EXAMPLE II

Comparative studies were conducted upon a high NSI (Run 1) and low NSi (Run 6) products prepared from a 12.7 NSI protein concentrate (Run 2) of a slightly lower protein content than the protein concentrate used in Example 1. The Run 2 protein concentrate was obtained by extracting the lipids with hexane/ethanol and the water-solubles with aqueous ethanol.

The comparative studies also included the following commercially available products: Run 3 (concentrate manufactured and distributed by Lucas & Co., Ltd., Bristol, England); Runs 4 and 7 (isolates manufactured and distributed by Ralston Purina Company, St. Louis, Mo.); Runs 5 and 10 (soy protein concentrates manufactured and distributed by Griffith Laboratories, U.S.A., Alsip, Il.); Run 8 (soy protein concentrate manufactured by Garvey Feeds, Muskogee, Okla.); and Run 9 soybean I-Grits (flour manufactured by A. E. Staley Manufacturing Company, Decatur, Illinois).

The Run 1 and Run 6 products were generally prepared in accordance with Example I excepting the following processing modifications: Run 1—Water to concentrate (d.s.b.) weight ratio 10:1, 0.5% sodium hydroxide (concentrate d.s.b.), 93° C. processing temperature, discharge pH 7.25 and 0.037" stator and rotor clearance; Run 6—Water to concentrate (d.s.b.) weight ratio of 7:1, 0.25% sodium hydroxide (concentrate d.s.b.), 0.037" clearance, 3500 rpm, 93° C. processing temperature and a pH 6.85 discharge.

The comparative products were assayed in accordance with the Example I methodology, the results of which are reported in the following table.

TABLE

| | Run 1 | Run 2 | Run 3 | Run 4 | Run 5 | Run 6 | Run 7 | Run 8 | Run 9 | Run 10 |
|---|---|---|---|---|---|---|---|---|---|---|
| % Nitrogen (as is) | 10.04 | 10.36 | 9.83 | 14.28 | 10.48 | 10.48 | 12.26 | 10.22 | 7.78 | — |
| % Nitrogen (dsb) | 10.79 | 11.01 | 10.72 | 15.06 | 11.38 | 11.11 | 13.42 | 10.88 | 8.53 | — |
| % Protein (as is) N × 6.25 | 62.75 | 64.75 | — | 89.22 | 65.48 | 65.5 | 83.85 | 63.85 | 48.63 | — |
| % Protein (dsb) N × 6.25 | 67.42 | 68.81 | 68.7 | 94.11 | 71.1 | 69.42 | 93.96 | 68.00 | 53.30 | — |
| % Ash (as is) | 6.31 | 6.18 | 5.04 | 3.68 | 3.68 | 6.22 | 3.34 | 4.51 | 6.10 | — |
| % Ash (dsb) | 6.78 | 6.57 | 5.5 | 3.88 | 4.00 | 6.59 | 3.75 | 4.8 | 6.69 | — |
| NSI | 72.3 | 12.7 | 73.2 | 1.1 | — | 39.6 | — | — | — | — |
| dry solids | 93.07 | 94.10 | 91.7 | 94.8 | 92.1 | 94.35 | 91.36 | 93.9 | 91.23 | — |
| M.W. | | | | | | | | | | |
| % $>1.5 \times 10^6$ | 46.53 | 14.98 | 36.09 | 23.36 | 13.59 | 58.84 | 2.62 | 14.94 | 14.81 | 14.97 |
| % $>1 \times 10^6$-$<1.5 \times 10^6$ | 6.92 | 8.85 | 15.38 | 16.30 | 3.89 | 12.06 | 3.55 | 7.17 | 14.87 | 7.89 |
| % $>3.7 \times 10^5$-$<1 \times 10^6$ | 11.52 | 23.98 | 28.10 | 37.70 | 26.39 | 2.60 | 16.16 | 25.33 | 37.67 | 12.88 |
| % $>5 \times 10^4$-$<3.7 \times 10^5$ | 24.62 | 25.20 | 8.91 | 9.64 | 30.91 | 16.19 | 47.07 | 34.79 | 16.31 | 36.13 |
| % $<5 \times 10^4$ | 11.01 | 26.98 | 11.52 | 13.60 | 25.21 | 10.30 | 30.59 | 17.78 | 16.34 | 28.13 |

The chromatogrpahic protein fractions for Run 1 and Run 6 were also analyzed for water-soluble carbohydrates. For the unprocessed protein concentrate (Run 2), 95.13% by weight of the carbohydrate was fractionated with those proteins having a M.W. of less than $5\times10^4$ with the balance (4.87%) being excluded with the protein fraction having a M.W. greater than $1.5\times10^6$. In contrast, the processed product of Run 1 contained 69.15% by weight carbohydrate of a M.W. less than $5\times10^4$ with the carbohydrate balance (31.49%) being found along with the protein fraction of a greater than $1.5\times10^6$ M.W. The actual amount of carbohydrate having a M.W. less than $5\times10^4$ between Runs 1 and 6 remained relatively constant while the level of water-soluble carbohydrate having an apparent M.W. greater than $1.5\times10^6$ was increased in Run 1. The water-soluble, high molecular weight carbohydrates may comprise glyco-proteins (i.e., carbohydrates covalently linked to protein) or water soluble carbohydrates or mixtures thereof. The carbohydrates having a M.W. less than $5\times10^4$ consists essentially of carbohydrates of less than $1\times10^4$ M.W. and are believed to be primarily comprised of carbohydrates having a D.P. of less than 5. Comparative studies indicate a major proportion of the greater than $1\times10^6$ M.W. carbohydrate extracts and a significantly smaller weight percent of the lower molecular weight carbohydrates for the Run 10 product.

We claim:

1. A process for improving the water-solubility of a vegetable protein product said process comprising the steps of:

(A) supplying an aqueous vegetable seed feedstream to a homogenizer with said feed stream containing on a dry solids basis at least 30% by weight vegetable seed protein and a sufficient amount of base to maintain the feed stream within said homogenizer at a pH between about 6.5 to 9.0, (B) increasing (*i*) the water-solubility, *as ascertained by NSI, and* (*ii*) *the aggregate molecular weight* of the vegetable seed protein by subjecting the aqueous feed stream in the homogenizer to successive pressure and cavitation cycling at a temperature between about 50° C. to about 150° C.; and (C) recovering the vegetable protein product having an improved water-solubility therefrom, *said feed stream being homogenized in a centrifugal homogenizer, the aqueous vegetable feed stream comprising a soy protein concentrate characterized as having an NSI of less than 25, containing (on a buffered ash extractables weight basis) carbohydrate constituents of less than $5\times10^4$ molecular weight as the major carbohydrate and less than 20% by weight carbohydrates of a molecular weight greater than $1.5\times10^6$, said soy protein concentrate containing as its most predominant water soluble constituent, a protein within either the less than $5\times10^4$ M.W., $5\times10^4-3.7\times10^5$ M.W. or $3.7\times10^5-1\times10^6$ M.W. regions, the pH ranging from about 6.8 to about 8.5, the temperature ranging from at least 65° C. to about 115° C. with said temperature and pH being sufficient to provide a PIS of at least 55% as determined by the following equation:*

$$PIS=5.7459C-0.01717C^2-0.22932C\ pH+606.5\ pH-37.8169\ pH^2-2574.6$$

*wherein "PIS" represents the percentage of protein in solution for the product of step (B),* "C" represents the centrifugal homogenization processing temperature in centigrade degrees and "pH" represents the pH of the product as discharged from the centrifugal homogenizer, said product having an NSI of at least 55% *and containing (on a buffered-salt-extractable protein weight basis) protein aggregates of a molecular weight greater than $1.5\times10^6$ as a predominant protein constituent relative to the weight percent of protein constituents respectively within either the less than $5\times10^4$ molecular weight region, the $3.7\times10^5-1\times10^6$ molecular weight region or the $1\times10^6-1.5\times10^6$ molecular weight region; and the weight percent protein aggregates having a molecular weight greater than $1.5\times10^6$ exceeding the weight percent proteins in each of the other regions by at least 10 weight percent and is at least three times greater than the weight percent*

*of protein within the $1\times10^6-1.5\times10^5$ molecular weight region.*

[2. The process according to claim 1 wherein a sufficient amount of base is added to maintain the pH between about 7.0 to about 8.0.]

[3. The process according to claim 2 wherein the vegetable seed protein comprises soy protein.]

4. The process according to claim 1 wherein the weight ratio of water to seed protein (on a dry substance basis) ranges from about 9:1 to about 15:1 [and the temperature ranges from about 85° C. to about 120° C.].

[5. The method according to claim 4 wherein the aqueous vegetable seed feed stream is subjected to successive pressure and cavitation cycling in a centrifugal homogenizer.]

6. The process according to claim [5] *1* wherein the base comprises an alkali metal hydroxide.

[7. The process according to claim 6 wherein the vegetable protein product is recovered by adjusting the product obtained from step (b) to a pH from about 5.0 to about 7.0 and then dried to provide a dry product having an NSI of at least 55.]

[8. The process according to claim 6 wherein the vegetable seed protein consists essentially of a soy protein concentrate.]

[9. The process according to claim 8 wherein the pH is at least 7.3, the water to protein vegetable weight ratio ranges from about 7.1 to about 18.1 and the temperature ranges from about 90° C. to about 120° C.]

[10. The process according to claim 1 wherein the feed stream is homogenized in a centrifugal homogenizer, the aqueous vegetable feed stream comprises a soy protein concentrate characterized as having an NSI of less than 25, containing (on a buffered-salt-extractables weight basis) carbohydrate constituents of less than $5\times10^4$ molecular weight as the major carbohydrate and less than 20% by weight carbohydrates of a molecular weight greater than $1.5\times10^6$; the pH ranges from about 7.5 to about 8.0, the temperature ranges from at least 75° C. to about 115° C. with said temperature and said pH being sufficient to provide a PIS of at least 65% as determined by the following equation:

$$PIS-5.7459C-0.01717C^2-0.22932C\ pH+606.5\ pH-37.8169\ pH^2-2574.6$$

wherein "PIS" represents the percentage of protein in solution for the product of step (B), "C" represents the centrifugal homogenization processing temperature in centigrade degrees and "pH" represents the pH of the product as discharged from the centrifugal homogenizer.]

11. The process according to claim [10] *1* wherein the centrifugally homogenized product is adjusted to a pH ranging from about 6.0 to about 7.0 and recovered by drying in a spray dryer at an outlet temperature of less than 115° C.

[12. A vegetable seed protein product characterized as having an NSI of at least 55% and containing (on a buffered-salt-extractable protein weight basis) protein aggregates of a molecular weight greater than $1.5\times10^6$ as a predominant protein constituent relative to the weight percent of protein constituents respectively within either the less than $5\times10^4$ molecular weight region, the $5\times10^4-3.7\times10^5$ molecular weight region, the $3.7\times10^5-1+10^6$ molecular weight region or the $1\times10^6-1.5\times10^6$ molecular weight region; and the weight percent protein aggregates having a molecular weight greater than $1.5\times10^6$ exceeds the weight percent proteins in each of the other regions by at least 10 weight percent and is at least three times greater than the weight percent of protein within the $1\times10^6-1.5\times10^5$ molecular weight region.]

[13. The vegetable seed protein of claim 12 wherein the vegetable seed protein consists essentially of soy protein.]

[14. The soy protein product of claim 12 wherein the weight percent of protein aggregates having a molecular weight greater than $1.5\times10^6$ is at least two times greater than the weight percent of proteins within either the $3.7\times10^5$ to $1\times10^6$ region or the less than $5\times10^4$ region.]

[15. The product according to claim 12 wherein the product comprises a soy protein concentrate and essentially all of the protein aggregates having a molecular weight in excess of $1.5\times10^6$ also have a molecular weight greater than $5\times10^6$.]

[16. The soy protein concentrate product according to claim 15 wherein the weight percent of protein aggregates having a molecular weight greater than $1.5\times10^6$ is at least four times greater than the weight percent of proteins within the $1\times10^6-1.5\times10^6$ molecular weight region and at least three times greater than the weight percent of proteins within either the $3.7\times10^5$ to $1\times10^6$ molecular weight region or less than $5\times10^4$ molecular weight region.]

[17. The soy protein concentrate product according to claim 16 wherein the product has an NSI of at least 60%, the weight percent of protein aggregates having a molecular weight greater than $5\times10^6$ is at least 15% greater than the weight percent of proteins within either the $1\times10^6-1.5\times10^6$ molecular weight region, the $3.7\times10^5-1\times10^6$ molecular weight region, the $3\times10^4-3.7\times10^5$ molecular weight region or the less than $5\times10^4$ molecular weight region.]

[18. The product according to claim 17 wherein the water-soluble carbohydrates extractable with the protein fraction having a molecular weight less than $5\times10^4$ constitute, on a carbohydrate weight basis, the major extractable carbohydrate of said soy protein concentrate.]

[19. The product according to claim 18 wherein at least 65% by weight of the water-soluble carbohydrate of the soy protein concentrate is comprised of carbohydrates having a molecular weight less than $5\times10^4$ with the balance of the carbohydrate being comprised of water-soluble carbohydrate of a molecular weight of greater than $1.5\times10^6$.]

[20. In a food composition containing carbohydrate and a water-soluble protein, the improvement which comprises replacing at least a portion of the water-soluble protein with a water-soluble vegetable seed protein characterized as having an NSI of at least 55% and containing (on a buffered-salt-extractable protein weight basis) protein aggregates of a molecular weight greater than $1.5\times10^6$ in an amount exceeding by at least 10 weight percent, the weight percent of protein constituents respectively within either the less than $5\times10^4$ molecular weight region, the $5\times10^4-3.7\times10^5$ molecular weight region, the $3.7\times10^51\times10^6$ molecular weight region or the $1\times10^6-1.5\times10^6$ molecular weight region; and the weight percent of protein aggregates having a molecular weight greater than $1.5\times10^6$ is at least three times greater than the weight percent of protein within the $1\times10^6-1.5\times10^6$ molecular weight region.]

[21. The composition of claim 20 wherein the vegetable seed protein consists essentially of soy protein.]

[22. The composition of claim 20 wherein the weight percent of protein aggregrates having a molecular weight greater than $1.5\times10^6$ is at least two times greater than the weight percent of protein within either the $3.7\times10^5-1\times10^6$ molecular weight region or the less than $5\times10^4$ molecular weight region.]

[23. The composition according to claim 20 wherein the weight percent of protein aggregates having a molecular weight greater than $1.5\times10^6$ is at least four times greater than the weight percent of proteins within the $1\times10^6-1.5\times10^6$ molecular weight region and at least three times greater than the weight percent of proteins within either the $3.7\times10^5-1\times10^6$ molecular weight region or less than $5\times10^4$ molecular weight region.]

[24. The composition according to claim 20 wherein the product has an NSI of at least 60%, the vegetable seed material consists essentially of a soy protein concentrate, the weight percent of the protein aggregate of a molecular weight greater than $1.5\times10^6$ is at least 15% greater than the weight percent of proteins within either the $1\times10^6-1.5\times10^6$ molecular weight region, the $3.7\times10^5-1\times10^6$ molecular weight region, the $5\times10^4-3.7\times10^5$ molecular weight region or the less than $5\times10^4$ molecular weight region.]

[25. The composition according to claim 24 wherein the composition contains an emulsion comprised of soy protein concentrate, water and triglyceride oil in amounts as defined by the equation:

$$Y=-807.86+0.1132\ W^2+0.3285\ P^2+15.579\ 9\ O-0.06458\ O^2$$

wherein Y represents a value of less than 8.5, P, W, and O respectively represent the water-soluble soy protein concentrate, water and oil weight percents.

* * * * *